United States Patent
Lillibridge et al.

(10) Patent No.: US 9,130,852 B2
(45) Date of Patent: Sep. 8, 2015

(54) GENERATING A SUMMARY OF USERS THAT HAVE ACCESSED A RESOURCE

(75) Inventors: Mark David Lillibridge, Mountain View, CA (US); Kimberly Keeton, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1450 days.

(21) Appl. No.: 12/430,236

(22) Filed: Apr. 27, 2009

(65) Prior Publication Data

US 2010/0274888 A1 Oct. 28, 2010

(51) Int. Cl.
*G06F 15/173* (2006.01)
*H04L 12/26* (2006.01)
*G06F 11/34* (2006.01)

(52) U.S. Cl.
CPC ............ *H04L 43/12* (2013.01); *G06F 11/3495* (2013.01); *G06F 2201/875* (2013.01)

(58) Field of Classification Search
CPC .. H04L 43/50; G06F 15/173; G06F 17/30241

USPC ......................................................... 709/224
See application file for complete search history.

(56) References Cited

U.S. PATENT DOCUMENTS

| | | | |
|---|---|---|---|
| 2005/0027858 A1* | 2/2005 | Sloth et al. ..................... | 709/224 |
| 2009/0132579 A1* | 5/2009 | Kwang ......................... | 707/102 |
| 2009/0193360 A1* | 7/2009 | Escuer .......................... | 715/810 |
| 2009/0300173 A1* | 12/2009 | Bakman et al. ............... | 709/224 |

OTHER PUBLICATIONS

Automating Network Application Dependency Discovery: Experiences, Limitations, and New Solutions, Xu Chen et al., Microsoft Research, University of Michigan, 8th USENIX Symposium on Operating Systems Design and Implementation, Dec. 8-10, 2008 (pp. 117-130).

* cited by examiner

*Primary Examiner* — Hitesh Patel
(74) *Attorney, Agent, or Firm* — Trop, Pruner & Hu, P.C.

(57) ABSTRACT

Information relating to monitored communications between user machines and a resource of a particular machine is received. Group information that identifies groups of the users is received. Based on the monitored communications and the group information, a summary of a subset of users that have accessed the resource is generated.

19 Claims, 2 Drawing Sheets

GENERATING A SUMMARY OF USERS THAT HAVE ACCESSED A RESOURCE

BACKGROUND

An enterprise (e.g., company, educational organization, government agency, etc.) typically includes various machines, including computers, storage systems, communications devices, and so forth. The machines include various resources that are accessible by and can be shared by the users in the enterprise. Examples of resources include processing resources, storage resources, communications resources, software resources, and so forth.

An information technology (IT) department of an enterprise typically has a poor understanding of which users are using which resources. In some cases, an IT department may manually perform a census to identify users of particular resources in the enterprise. However, such a manual census technique is time-consuming and expensive.

BRIEF DESCRIPTION OF THE DRAWINGS

Some embodiments of the invention are described with respect to the following figures.

DETAILED DESCRIPTION

Figure 1:
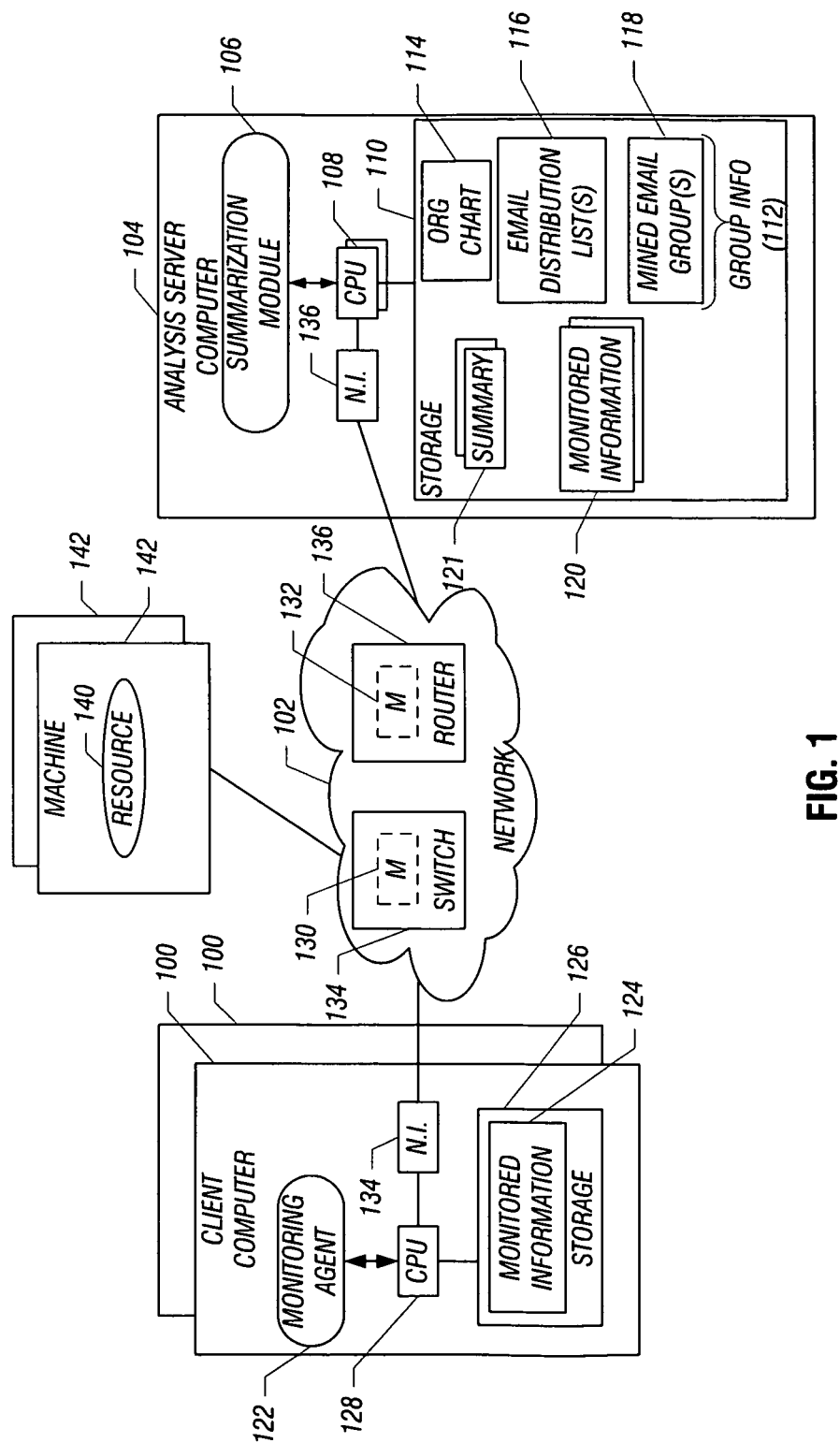
FIG. 1 is a block diagram of an exemplary arrangement of a system, in which an embodiment of the invention is incorporated.

In accordance with some embodiments, a summarization mechanism is provided to automatically generate a summary of users that have accessed certain resources within an enterprise, (e.g., company, educational organization, government agency, etc.). Examples of resources of the enterprise include processing resources, storage resources, communications resources, software resources, and so forth. In one example, the enterprise may provide one or more server computers on which software applications are loaded, where users at client computers are able to access the server computers to utilize such software applications. Also, storage server systems can also be present that provide storage resources accessible by users for storing data and other information. Communications devices can also be present in the enterprise that provide communications capabilities to allow users in the enterprise to perform communications, such as voice calls, video conferencing sessions, and so forth. Other examples of resources include services provided by machines, files, web resources, file directories, file trees, file groups, and so forth.

Typically, an information technology (IT) department of an enterprise has a relatively poor understanding of which users are accessing certain resources within the enterprise. Conventionally, an IT department may attempt to perform a manual census to determine which users are using what resources, which is typically time-consuming and relatively expensive. However, by using the summarization mechanism according to some embodiments, an automated technique is provided of generating summaries of users that have accessed particular resources in the enterprise. A "summary" refers to any human-understandable report, visualization, or other representation that contains information of interest to the intended recipient of the summary.

For a given resource (where "resource" can refer to one resource or a collection of resources), the summarization mechanism is able to receive information indicating a set of users that have accessed the resource. The summary that is generated by the summarization mechanism according to some embodiments identifies less than all (a subset) of the users in the set that have accessed the resource. In other words, instead of merely identifying all users who have accessed the resource, the summary identifies some subset of the users to provide a more meaningful summarization. Identification of users in the summary includes identifying one or more groups of users, where each group is represented by a human-recognizable name (e.g., sales group of product X, design group for product Y, Sally Z's group, marketing department, accounting department, etc.). A human-recognizable name of a group may be a name that allows a user to recognize the function, role, or other characteristic of the group within the enterprise based on the name. In addition to identifying one or more groups of users, the summary can also identify individual users. For example, the summary can indicate that users who have accessed application B on machine C include personnel in the sales group for product X as well as Tom J. (who is not in the sales group for product X).

The summaries that provide information about who uses what resources within an enterprise have various applications. For example, if the IT department has to take a particular resource down for preventative maintenance, then the IT department can determine (from one or more summaries created by the summarization mechanism) which users to notify (e.g., notify everyone in the marketing department). Another example involves electronic discovery for litigation, where the legal department may wish to find and preserve data stored or used by a particular group of users. Other example uses of the summaries include determining from the summaries how many servers are used by the manufacturing department, the amount of data accessed in a typical day by the marketing department, and so forth. Also, based on the summaries, it can be determined whether any particular resource can be removed or decommissioned. As yet another example, the summary(ies) can be used to determine which employees are backing up their data. As another example, the summaries can be used to determine what a machine is used for (e.g., hosts a sharepoint for the marketing department) and what type of data the machine has (e.g., it is used by the legal department so it probably holds legal documents).

The summarization mechanism according to some embodiments monitors communications between user machines (such as user computers, personal digital assistants, smart phones, etc.) and machines containing resources that are accessed by the user machines. In addition, the summarization mechanism accesses information that identifies groups of users. Based on the monitored communications and information identifying groups of users, the summarization mechanism is able to generate one or more summaries of which users are using what resources. The summarization mechanism allows association between users and corresponding resources to be obtained on a continual basis, and in a relatively inexpensive manner.

In one embodiment, the information that identifies groups of users can be in the form of an organization chart that identifies various departments, divisions, or other groups within the enterprise, and the personnel that are within such corresponding departments, divisions, or other groups. The personnel of the enterprise that are within such groups are referred to as "users" in this discussion.

In an alternative embodiment, the group information that is used by the summarization mechanism can be one or more email distribution lists, where an email distribution list can include user-defined groups (e.g., sales group for product X, design group for product Y, production group for product Z, etc.). The email distribution lists can reside on user machines, or alternatively, at server computers (such as email server computers). Instead of email distribution lists, the summarization mechanism can employ information identifying text chat or text messaging groups, or other types of communication distribution lists used for other types of communications among users.

Alternatively, instead of relying on groups explicitly defined in email distribution list(s) or other like group indications, the mechanism according to some embodiments can monitor emails (or other types of communications) among the personnel of the enterprise, and based on such monitoring, the enterprise can determine groups of personnel that usually communicate with each other about certain issues (e.g., particular products, particular issues, etc.). This process is referred to as mining communications among users for determining groups of users who communicate with each other.

Other information that can identify groups of users includes access control lists. An access control list specifies a list of users that are allowed to access a particular file. Also, information can be provided that indicates which users are located where (e.g., users in a particular building or floor of a building).

FIG. 1 is a block diagram of an exemplary system that incorporates an embodiment of the invention. FIG. 1 shows client computers 100 (which are one form of user machines) coupled over a network 102 to an analysis server computer 104. The "network" 102 can represent one network or multiple networks. Although just one analysis server computer 104 is shown, a different implementation can use multiple analysis server computers.

The analysis server computer 104 includes a summarization module 106 according to an embodiment for summarizing users who are using corresponding resources deployed on machines of an enterprise. The summarization module 106 can be implemented as a software module that is executable on one or multiple central processing units (CPUs) 108. The CPU(s) 108 is (are) connected to a storage subsystem 110, which can be implemented with disk-based storage, semiconductor storage, and so forth. The storage subsystem 110 includes group information 112, with some examples being an organization chart 114, email distribution list(s) 116, and mined email groups 118 (which have been derived based on monitored email communications among users of the enterprise). In other implementations, instead of or in addition to the email distribution list(s) 116 and mined email group(s) 118, other types of communication distribution lists or mined communication groups can be provided.

The organizational chart 114 can be retrieved by the analysis server computer 104 from a predetermined server (or predetermined servers), such as a Lightweight Directory Access Protocol (LDAP) server or other type of server. LDAP defines a protocol for querying and modifying directory services, where a directory is a set of objects with similar attributes organized in a logical and hierarchical manner.

The summarization module 106 is able to receive information relating to monitored communications between user machines and machines 142 that are accessed by the user machines. Alternatively, the received information relates to monitored communications between user machines and corresponding resources 140 of the machines 142. Such information relating to monitored communications is stored as monitored information 120 in the storage 110 of the analysis server computer 104. The analysis server computer 104 uses the monitored information 120 and the group information 112 to generate at least one summary 121 that identifies users that have accessed a resource.

In one implementation, the summarization module 106 is able to compile relationships between users and specific machines. For example, if the client computer of user A has established a communications session with machine X, then the summarization module 106 determines that user A has accessed machine X, and records that information.

In addition or alternatively, the summarization module 106 can associate users with resources provided by a machine. A list of resources on each given machine can be compiled based on protocols, ports (including well-known mappings between specific port numbers and services), and processes used to communicate with the machine. For example, if user A has established a communications session with machine X using port 2049, then it can be determined that machine X is running an NFS server. By identifying the resources on each machine and monitoring users accessing such resources, the summarization module 106 is also able to compile a relationship between users and resources on the machine. For example, it may be that user A but not user B uses the NFS server on machine X, so that there will be a relationship between user A and (machine X, NFS) but no relationship between user B and (machine X, NFS).

As another example, the summarization module 106 can also associate resources such as files, file directories, websites, etc., with users. The summarization module 106 may be able to track a path name or URL that has been accessed to determine which files each user is using, or more coarsely, which parts of the file system/website the user is using. The summarization module 106 may also be able to distinguish between reads and writes of file systems so as to distinguish between files a user writes and those the user merely reads.

In addition to identify user access of internal resources of the enterprise, the summarization module 106 may also identify what users are accessing external resources (outside the enterprise).

The monitored information 120 received by the analysis server computer 104 is communicated over the network 102. In one embodiment, the monitored information 120 is collected by monitoring agents 122 in respective client computers 100. The monitoring agent 122 in a client computer 100 monitors communications between the client computer 100 and resources in the enterprise, and stores such monitored information as 124 in a storage 126 of the client computer 100. The monitoring agent 122 is executable on one or more CPUs 128 of the client computer 100. The monitored information 124 collected by each monitoring agent 122 is sent over the network 102 to the analysis server computer 104.

In an alternative implementation, instead of using the monitoring agents 122 to monitor communications between client computers 100 and the machines accessed by clients 142, monitoring agents can be provided in switches, routers, or other types of communications devices in the network 102, such as monitoring agent 130 or 132 in a switch 134 or router 136, respectively, in the network 102. Alternatively, the monitoring agent 130 or 132 can be provided on another machine in the enterprise.

In one example, the monitoring agent 122, 130, or 132 depicted in FIG. 1 can be combined with a firewall agent to make packet inspections cheaper to perform.

As further depicted in FIG. 1, each client computer 100 includes a network interface 154 and the analysis server computer 104 includes a network interface 156 The network interfaces 134 and 136 allow the client computer 100 to communicate over the network 102 with the analysis server computer 104.

The types of information that can be recorded by a monitoring agent (e.g., 122, 130, or 132) include one or more of the following: an identification of a resource (e.g., a machine, application, file, a requested uniform resource locator (URL) or file identifier, etc.) that the client computer 100 is communicating with/requesting; the protocol that is used, such as a Transmission Control Protocol (TCP) or User Data Protocol (UDP); the port that is used (e.g., a port number 2049 can indicate that a network file system (NFS) resource is being used while a port number 80 can indicate that a Hypertext Markup Language (HTML) resource is being used, for example); the process that is performing a communication (e.g., a file transfer protocol (FTP) process); the direction of the connection (which machine established the connection with the other machine); the direction in which the majority of data bytes is transmitted; credential or other user identification information (e.g., a username); and so forth.

If a client computer 100 is shared among multiple users, then the monitoring agent is able to distinguish which user is requesting which communication. This can be performed, for example, by assuming that the user logged in at the client computer 100 performs all communications.

For each resource, the summarization module 106 generates a summary of the users accessing that resource. The summarization module 106 attempts to generate a short, concise summary that will be understandable to most employees in the enterprise. Simply generating a list of the names of all the users, by contrast, is neither understandable nor useful in practice. What is an IT manager to do with a list of 600 names of people the IT manager does not recognize? Instead, the summarization module 106 uses human-recognizable group names to replace the names of the users in those groups. Thus, the 600 names might be reduced to "The North American Eastern region sales team and the Massachusetts IT team," which is both short and meaningful to employees.

Note that this technique only works with groups with short names or descriptions that are recognizable by employees. Such groups can be found in organization charts ("the North American Eastern region sales team"), email distribution lists ("engineers@acme.widget"), site population lists ("people in building 20"), etc. In general, arbitrary sets of users are very unlikely to form such a group.

Some approximation is usually performed to achieve such concise summaries; probably not every member of the North American Eastern region sales team used the resource but if 95% of the North American Eastern region sales team used the resource and 80% of the Massachusetts IT team used the resource and no one else used the resource, then this is probably a good concise summary of the usage. If desired, the percentages can be included as follows: "The North American Eastern region sales team (95%) and the Massachusetts IT team (80%)."

There is a tension between accuracy (not omitting users that use a resource or including users that don't use the resource) and conciseness. Listing a larger number of smaller groups and individual people increases accuracy at the cost of making the summary longer than using fewer, larger groups and individual people.

There are a number of possible techniques for generating such a summary. One technique involves using the organization chart 114 to find the lowest (in the sense of farthest away from the chief executive officer or head of the enterprise) group that includes all the accessing users except possibly for a few outliers (the outliers may be listed separately). More generally, the algorithm used by the summarization module 106 may be configured to find a group of users that is as small as possible that cover all users that have accessed a particular resource, but includes as few non-users (users who have not accessed the particular resource) as possible.

More generally still, this problem can be turned into an optimization problem, where the goal is to maximize the total sums of rewards and penalties. A penalty can be assessed for each group or individual name included in the summary and for each non-user of the resource covered by the summary, and by assigning a reward for each user of the resource covered by the summary. By assigning different weights to these cases, different trade-offs between conciseness and accuracy can be made. For example, if conciseness is valued much more than accuracy, the penalties for making the summary longer (extra group and individual names) can be made much more severe than the penalties and rewards for covering the wrong users. In some embodiments, the penalties may be nonlinear: each additional group name may incur a steadily increasing penalty, for example.

Note that the set of groups considered is restricted to groups with human-recognizable names as discussed above. The penalties/rewards may also in some embodiments depend on properties of the users. For example, in a summary intended to be used to understand who the heaviest users of a resource are, the penalty/reward of a group or user might be greater the more that group or user used the resource. By using this technique, the accuracy of the membership of "important people" can be increased at the cost of the accuracy of "unimportant people", while keeping conciseness the same.

Other ways of formulating this optimization problem are possible; for example, instead of rewarding/penalizing which users are covered directly, a penalty/reward might be given for the percentages of coverage of each of the group/names. This allows larger groups to get more absolute members' membership wrong because only their percentage wrong is being considered.

Other embodiments might permit the summary to list excluded group or individual names in addition to included group or individual names. This would allow for summaries like "The North American Eastern region sales team except for the Vermont sales team and the Massachusetts IT team except for Bob Shaw." Appropriate penalties would have to be defined for such names; because exclusions are usually harder to understand than inclusions, they should probably have a higher penalty than included group or individual names.

This optimization problem can be solved using one of the many techniques, such as linear programming, constraint programming, or heuristics like genetic algorithms and simulated annealing.

The information regarding who uses what resource evolves over time. Historical records of such information can be maintained to use for such applications as electronic discovery for litigation, where knowing which machines employees have used in the past can be quite valuable. The information can also keep track of how often, how recently, and what time of day a given employee has accessed a given resource. In some embodiments, an association between a user and a resource can be sufficiently old (in the past) such that this association is considered obsolete.

Also, for certain user-resource pairs, it may be desirable to distinguish between incidental use and heavy use. For example, incidental access of a resource can be disregarded when generating a summary.

In addition, temporal information can also be kept about when the communications occur. For example, it may be possible to observe network meetings (e.g., a meeting conducted using Microsoft's NetMeeting software), and which employees attend such network meetings. The summarization module 106 can generate a summary that summarizes the participants of the meetings (along with the times of such meetings).

Figure 2:
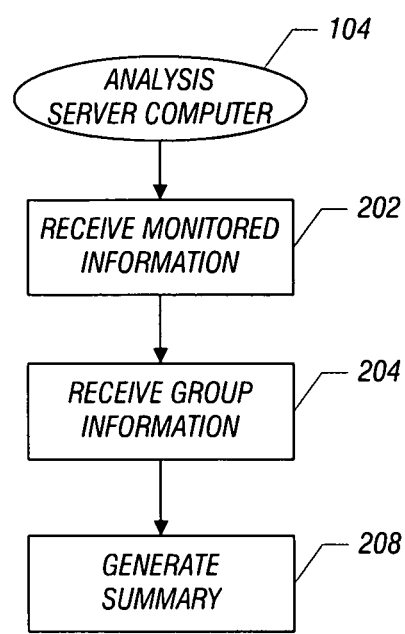
FIG. 2 is a flow diagram of a process according to an embodiment of generating a summary of users who have accessed a resource.

FIG. 2 illustrates a general process performed by the summarization module 106 in the analysis server computer 104 according to an embodiment. The summarization module 106 receives (at 202) monitored information 120 (FIG. 1), where the monitored information 120 includes information collected by one or more monitoring agents in the client computers 100 and/or in the switches or routers in the network 102. The monitored information contains information relating to communications between client computers and resources.

The summarization module 106 also receives (at 204) group information 112 (FIG. 1) that identifies groups to which users of the enterprise belong.

Based on the received monitored information and the group information, summarization module 106 generates (at 206) one or more summaries that each identify users that have used a particular resource (where "resource" can be a single resource or collection of resources). As noted above, each summary identifies at least one group of users that have accessed the resource, where the group has a human-recognizable name. The summary can also identify outlier users who are not part of the at least one group.

Figure 3:
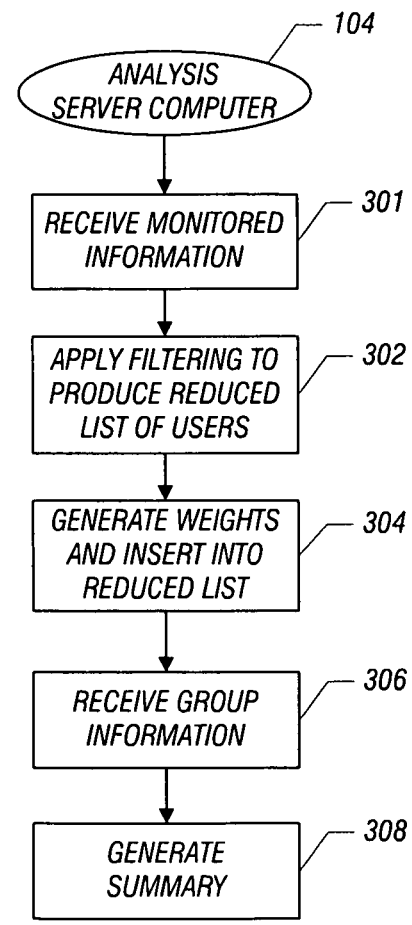
FIG. 3 is a flow diagram of a process according to another embodiment of generating a summary of users that have accessed a resource.

FIG. 3 is a flow diagram of a process according to another embodiment. In FIG. 3, the summarization module 106 receives (at 301) monitored information 120 (FIG. 1). In this embodiment, filtering is performed to reduce the universe of users who have accessed particular resources that are to be considered by the summarization module 106. The summarization module 106 applies filtering (at 302) to remove communications that are not meaningful or interesting. The filtering can be based on one or more criteria. For example, one criterion specifies that short communications sessions should be ignored, where a "short" communications session can be defined in terms of time or number of bytes sent and received. This criterion can specify a minimum time (e.g., any communications session that has a duration less than X seconds can be ignored) or minimum number of bytes sent and received (e.g., a communications session that has less than Y minimum number of bytes sent and received can be ignored).

Another criterion specifies that communications sessions made only during a boot or login process can be ignored. Such communications sessions can be marked as system connections. Such system connections are likely to be connections that relate to antivirus definition updates, checking for up-to-date patches, and so forth.

Alternatively, an application programming interface (API) may be provided by a monitoring agent that allows the system to inform the monitoring agent that a particular communications session is a system connection that should be ignored.

An IT administrator can also specify that any communications session established with a particular list of machines, list of (machine, resource) pairs, list of ports, or list of processes can be ignored.

The above filtering criteria can be applied by a monitoring agent.

Filtering applied by the analysis server computer 104 can include the following. Any resource that every employee establishes communications with (once) is likely to be uninteresting. Any resource that each employee talks to at most one time is likely to be uninteresting. IT personnel may audit communications sessions and mark some of them as uninteresting or particularly interesting. These labeled training examples can be used as inputs for machine learning algorithms, which can be applied to build classifiers to automatically infer such labels for non-audited communications sessions. The classifiers can be used to automatically mark communications sessions as uninteresting or interesting. It may be desirable to collect additional information about each communications session (e.g., time information) to provide additional features for the classifiers to work on.

Similarly, in cases where which service is being used is uncertain (e.g., such as in scenarios where many services share the same port number), auditing and labeling by a classifier can increase the accuracy of service guesses.

The filtering applied (at 302) produces a reduced list of users that have accessed each given resource. For corresponding multiple resources, there may be multiple reduced lists provided. The reduced list of users for a given resource includes a smaller number of users than the universe of all users who have accessed the given resource, due to application of the filtering. After filtering has been applied, the summarization module 106 generates (at 304) weights that represent relative usage of a particular resource among respective users. Some users may more heavily use (e.g., larger amount of data transferred, longer session time, etc.) the particular resource than other users. Weights can be assigned based on such relative usage, with certain users assigned higher weights (to represent heavier usage) and other users assigned lower weights (to represent lighter usage). Some exemplary factors considered in assigning weights include one or more of: frequency of usage of the resource, recency of usage of the resource, and amount of usage of the resource. Moreover, if it is known that a particular user or group of users owns a given resource, then their use of that resource may receive greater weight. Generally, the weights associated with users represent relative importance of usage of the resource by corresponding users. As yet another alternative, weights can be assigned based on the specified purpose of the summary. For example, a user can specify what the summary is to be used for, such as by making a selection from a number of menu items or by turning a knob in a graphical user interface. The specified purpose of the summary can affect the weights assigned.

The weights can be provided in the reduced list for the given resource, to provide a weighted list for each given resource.

The summarization module 106 also receives (at 306) group information 112 (FIG. 1) to identify groups of users in the enterprise. Then, based on the group information and the weighted list of users, the summarization module 106 generates (at 308) a summary for the given resource. In generating the summary based on the weighted list, the summarization module 106 can attempt to identify a group that contains as many users associated with higher weights as possible—the users associated with lower weights that are not part of the group can be considered outliers who can be individually identified in the summary.

In some implementations, a summary created by the summarization module 106 can also include weights associated with corresponding users. A summary can indicate that the given resource is used by group G plus 20 incidental other users, rather than just 23 unrelated users. Or, with the previous example, the summary might indicate that the given resource is used 70% of the time by the North American Eastern region sales team and 30% of the time by the Massachusetts IT team.

Additional data provided by IT personnel can also be used in producing the summary produced by the summarization module 106. For example, it may be known which services are using which ports on a given machine, to avoid the possibility of a wrong guess about which service a particular port on the machine represents. Alternatively, additional information about a particular service on a given machine may be available beyond the name of that service—this information can be attached to any resulting communications session for use in later producing summaries or for viewing.

Instructions of software described above (including the summarization module 106 and monitoring agents 122, 130, 132 of FIG. 1) are loaded for execution on a processor (such as one or more CPUs 108, 128 in FIG. 1). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
    receiving, by an analysis computer, information relating to monitored communications between user machines and a resource of a particular machine;
    receiving, by the analysis computer, group information that identifies groups of users;
    based on the monitored communications and the group information, generating a summary of a subset of users that have accessed the resource, wherein generating the summary comprises identifying, from the group information, a group of users that has accessed the resource, wherein identifying the group comprises selecting the identified group from plural groups that each covers users that have accessed the resource, and wherein the identified group is named in the summary instead of the users in the identified group, wherein the generating of the summary comprises solving an optimization problem that maximizes a sum of rewards and penalties, where a penalty is assessed for each group or individual name included in the summary and for each non-user of the resource covered by the summary, and a reward is assigned for each user of the resource covered by the summary; and
    using the generated summary during maintenance of an information technology (IT) resource.

2. The method of claim 1, wherein the user machines are associated with a set of users that use the user machines, and wherein the subset of users in the summary is part of the set of users.

3. The method of claim 1, wherein selecting the identified group from among the plural groups identified by the group information comprises selecting the identified group that contains a larger number of the users of the resource but a smaller number of or no non-users of the resource as compared to others of the plural groups.

4. The method of claim 1, wherein receiving the group information comprises receiving information selected from among one or more organization charts, one or more communication distribution lists, communication groups mined from communications among users, access control lists, and information grouping users by location.

5. The method of claim 1, wherein the resource is selected from among the particular machine, a service provided by the particular machine, a file, a web resource, a file directory, a file tree, and a file group.

6. The method of claim 1, further comprising monitoring the communications between the user machines and the resource, wherein the monitoring is performed at the user machines or at one or more monitoring agents separate from the user machines.

7. The method of claim 1, further comprising providing in the summary information indicating relative usage of the resource among the subset of users identified in the summary.

8. The method of claim 1, further comprising:
    producing a weighted list of users that associates weights with users to indicate relative importance in usage of the resource among the users identified by the weighted list,
    wherein generating the summary is further based on the weighted list.

9. The method of claim 8, further comprising generating the weights based on one or more factors selected from among frequency of usage of the resource, recency of usage of the resource, amount of usage of the resource, whether usage of the resource is by a user that is part of a group that owns the resource, and a requested purpose of the summary.

10. A method comprising:
    receiving, by an analysis computer, information relating to monitored communications between user machines and a resource of a particular machine;
    receiving, by the analysis computer, group information that identifies groups of users;
    based on the monitored communications and the group information, generating a summary of a subset of users that have accessed the resource, wherein the generating of the summary comprises solving an optimization problem that maximizes a sum of rewards and penalties, where a penalty is assessed for each group or individual name included in the summary and for each non-user of the resource covered by the summary, and a reward is assigned for each user of the resource covered by the summary;

applying one or more filtering criteria to disregard a subset of the monitored communications in generating the summary; and using the generated summary during maintenance of an information technology (IT) resource.

11. The method of claim 10, wherein the filtering criteria is selected from among a criterion specifying that a communications session of less than a predefined time interval is to be disregarded, a criterion specifying that a communications session that has exchanged less than a predefined amount of data is to be disregarded, a criterion that specifies that system connections are to be disregarded, and a criterion that specifies that communications sessions with predetermined resources are to be disregarded.

12. An article comprising at least one non-transitory computer-readable storage medium containing instructions that upon execution cause a computer to:

produce a list of users that have accessed a resource of a machine, wherein producing the list of users comprises:
generating weights to indicate relative importance of usage of the resource among the users in the list; and providing the weights in the list;

receive information identifying groups of users;

based on the list and the received information identifying groups of users, generate a summary of a subset of the users in the list that have accessed the resource, wherein the generating of the summary comprises solving an optimization problem that maximizes a sum of rewards and penalties, where a penalty is assessed for each group or individual name included in the summary and for each non-user of the resource covered by the summary, and a reward is assigned for each user of the resource covered by the summary; and use the generated summary during maintenance of an information technology (IT) resource.

13. The article of claim 12, wherein producing the list of users further comprises:

monitoring communications between user machines and the resource;

applying at least one filtering criterion to discard a subset of the monitored communications, to produce a reduced set of monitored communications, wherein producing the list of users is based on the reduced set of monitored communications.

14. The article of claim 12, wherein generating the summary comprises generating the summary so that the summary contains a human-recognizable name of at least one group of the users in the list.

15. A computer comprising:
a storage; and
a processor to:
obtain group information identifying groups of users and store the group information in the storage;
receive information identifying users that have accessed a resource of a machine;
select a particular group from among plural groups specified by the group information, wherein each of the plural groups covers users that have accessed the resource, and the particular group is selected from the plural groups according to at least one selection criterion;
produce a summary that identifies the particular group of users that have accessed the resource, the producing of the summary comprises solving an optimization problem that maximizes a sum of rewards and penalties, where a penalty is assessed for each group or individual name included in the summary and for each non-user of the resource covered by the summary, and a reward is assigned for each user of the resource covered by the summary; and
use the produced summary during maintenance of an information technology (IT) resource.

16. The computer of claim 15, wherein the summary contains a human-recognizable name of the particular group of users.

17. The computer of claim 16, wherein the summary further contains a name of another user that accessed the resource separate from the users contained in the particular group of users.

18. The method of claim 1, wherein selecting the identified group from the plural groups identified by the group information comprises selecting a smaller one of the plural groups.

19. The method of claim 15, wherein the at least one selection criterion specifies that a smaller of the plural groups is to be selected.

* * * * *